United States Patent
Short et al.

(10) Patent No.: US 11,467,553 B2
(45) Date of Patent: Oct. 11, 2022

(54) EFFICIENT CONFIGURATION OF SCENARIOS FOR EVENT SEQUENCING

(71) Applicant: Accenture Global Solutions Limited, Dublin (IE)

(72) Inventors: Matthew Thomas Short, San Jose, CA (US); Mary Elizabeth Hamilton, San Mateo, CA (US); Grace T. Cheng, Mountain View, CA (US); Michael E. Simanek, Chicago, IL (US); Andrew Albert Nat, III, Pacifica, CA (US); Amir M. Khan, Frisco, TX (US); Joseph Pollock, Piedmont, CA (US); Fadi Mahmoud, Sausalito, CA (US); Michael Baroody, San Francisco, CA (US)

(73) Assignee: Accenture Global Solutions Limited, Dublin (IE)

( * ) Notice: Subject to any disclaimer, the term of this patent is extended or adjusted under 35 U.S.C. 154(b) by 283 days.

(21) Appl. No.: 16/658,757

(22) Filed: Oct. 21, 2019

(65) Prior Publication Data

US 2020/0125050 A1 Apr. 23, 2020

Related U.S. Application Data

(60) Provisional application No. 62/748,769, filed on Oct. 22, 2018.

(51) Int. Cl.
*G05B 19/042* (2006.01)
*G06F 9/451* (2018.01)
*B60R 16/023* (2006.01)

(52) U.S. Cl.
CPC .......... *G05B 19/042* (2013.01); *G06F 9/451* (2018.02); *B60R 16/0231* (2013.01); *G05B 2219/23021* (2013.01); *G05B 2219/23258* (2013.01)

(58) Field of Classification Search
None
See application file for complete search history.

(56) References Cited

U.S. PATENT DOCUMENTS

| | | | |
|---|---|---|---|
| 2009/0211605 A1* | 8/2009 | Ahmad | B60S 1/481 134/18 |
| 2016/0039429 A1* | 2/2016 | Abou-Nasr | G06F 3/017 382/103 |

(Continued)

OTHER PUBLICATIONS

AllThingsSmart.xyz [online], "An Introduction to Using Node-Red with Home Assistant," Sep. 24, 2018, retrieved on Jun. 5, 2020, retrieved from URL<https://allthingssmart.xyz/an-introduction-to-using-node-red-with-home-assistant>, 10 pages.

(Continued)

*Primary Examiner* — Charles E Anya
(74) *Attorney, Agent, or Firm* — Fish & Richardson P.C.

(57) ABSTRACT

Methods, systems, and apparatus, including computer programs encoded on computer storage media, for initiating actions based on sequences of events. In one aspect, a process includes receiving, from each of multiple devices, data specifying an event detected by the device. The events are compared to configured scenarios that each specify a sequence of trigger events and an action to be initiated in response to detecting the sequence of trigger events. A determination is made that the events match a first scenario of the scenarios. In response to determining that the events detected by the multiple devices match the first scenario, a first action specified by the first scenario is initiated. A determination is made that a combination of one or more of the events detected by the multiple devices and the first action matches a second scenario. In response, a second action specified by the second scenario is initiated.

20 Claims, 5 Drawing Sheets

(56) References Cited

U.S. PATENT DOCUMENTS

| 2016/0162037 | A1* | 6/2016 | Park | G06F 3/04883 |
| | | | | 345/156 |
| 2017/0075701 | A1* | 3/2017 | Ricci | B60R 25/1004 |
| 2018/0088677 | A1* | 3/2018 | Zhang | G06F 3/0304 |
| 2019/0213425 | A1* | 7/2019 | Anderson | G06Q 40/08 |

OTHER PUBLICATIONS

DIYFuturism.com [online], "Basic Node-Red Flows for Automating Lighting with Home Assistant," Dec. 14, 2017, retrieved on Jun. 5, 2020, retrieved from URL<https://diyfuturism.com/index.php/2017/12/14/basic-node-red-flows-for-automating-lighting-with-home-assistant/>, 42 pages.

EP Extended European Search Report in European Appln. No. 19204664.7, dated Aug. 5, 2020, 13 pages.

Fibaro.com [online], "FIBARO Knowledge Base—[HC2/HCL] Creating Block Scenes," Dec. 8, 2016, retrieved on Jun. 5, 2020, retrieved from URL<https://manuals.fibaro.com/knowledge-base-browse/block-scenes/>, 7 pages.

GitHub.com [online], "Home Assistant MQTT Discovery," Oct. 20, 2018, retrieved on Jun. 5, 2020, retrieved from URL<https://github.com/home-assistant/home-assistant.io/blob/ead919f491c88b0c99df4224a980a4397159baa4/source/_docs/mqtt/discovery.markdown>, 7 pages.

SmarterHome.sk [online], "Fibaro Swipe—Control Your House with Hand Gestures," Jul. 26, 2016, retrieved on Jun. 5, 2020, retrieved from URL<https://smarterhome.sk/en/blog/fibaro-swipe-control-your-house-with-hand-gestures_53.html>, 8 pages.

EP Office Action in European Application No. EP19204664.7, dated Mar. 19, 2020, 3 pages.

* cited by examiner

EFFICIENT CONFIGURATION OF SCENARIOS FOR EVENT SEQUENCING

CROSS-REFERENCE TO RELATED APPLICATION

This application claims the benefit of U.S. Provisional Application No. 62/748,769, filed Oct. 22, 2018, and titled "EFFICIENT CONFIGURATION OF SCENARIOS FOR EVENT SEQUENCING," which is hereby incorporated by reference in its entirety.

BACKGROUND

Devices can be activated and controlled using various inputs. For example, some devices are voice-activated and some devices are activated using gestures (e.g., a person's hand moving in a particular pattern). Other devices are controlled using physical controls, such as buttons, switches, touchscreens, etc.

SUMMARY

This specification generally describes systems, methods, devices, and techniques for creating, configuring, modifying, testing, and using scenarios that each include an event, or a sequence of events, that trigger actions.

In general, one innovative aspect of the subject matter described in this specification can be embodied in methods that include the actions of receiving, from each of multiple devices, data specifying an event detected by the device. The events are compared to configured scenarios that each specify a sequence of trigger events and an action to be initiated in response to detecting the sequence of trigger events. A determination is made, based on the comparing, that the events detected by the multiple devices match a first scenario of the plurality of scenarios. In response to determining that the events detected by the multiple devices match the first scenario, a first action specified by the first scenario is initiated. A determination is made that a combination of one or more of the events detected by the multiple devices and the first action specified by the first scenario matches a second scenario of the plurality of scenarios. In response to determining that the combination of the one or more of the events detected by the multiple device and the first action specified by the first scenario matches the second scenario, a second action specified by the second scenario is initiated. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some aspects, the multiple devices include at least one sensor that detects, as an event, a measurement of a particular property and at least one user interaction detection device that detects a human performed action. The user interaction detection device can include one of (i) a gesture detection device that detects human gestures or (ii) a voice detection device that detects voice input.

Some aspects include providing a dashboard user interface that enables a user to configure and modify scenarios by selecting sequences of events and one or more actions for the scenarios. In some aspects, initiating the action specified by the first scenario includes determining, based on a state of a device that performs the first action specified by the first scenario, that a device that performs the first action is in a state in which the first action is capable of being performed, and, in response, initiating the first action.

In some aspects, receiving, from each of multiple devices, data specifying an event detected by the device includes receiving, for each device, data specifying whether the event invokes a scenario comparison process in which the events are compared to the scenarios. The events can be compared to the configured scenarios in response to the data for at least one of the events specifying that the at least one event invokes the scenario comparison process.

In some aspects, initiating the first action specified by the first scenario includes generating a message with a topic for the first action and data specifying the first action and transmitting the message to each device that is subscribed to the topic for the first action.

In general, another innovative aspect of the subject matter described in this specification can be embodied in methods that include the actions of receiving, from a first device, a message having a topic and a payload that includes data related to a first event. A determination is made whether a structure of the message matches a predefined structure for messages having the topic. In response to determining that the structure of the message matches the predefined structure for messages having the topic, the message is validated. In response to validating the message, the first event is compared to a multiple configured scenarios that each specify a sequence of trigger events and an action to be initiated in response to detecting the sequence of trigger events. A determination is made, based on the comparing, that the first event and one or more second events detected by the one or more second devices match a first scenario of the scenarios. In response to determining that the first event and the one or second events match the first scenario, a determination is made whether a current state of a third device that performs the action of the first scenario matches a post-action state that the third device would be in after the action is performed. Whenever the current state matches the post-action state, a determination is made to not send a message to the third device to perform the action. Whenever the current state does not match the post-action state, a message is send to the third device to perform the action. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The subject matter described in this specification can be implemented in particular embodiments and may result in one or more of the following advantages. Systems and techniques described herein enable users (e.g., user experience designers) to quickly configure scenarios that include sequences of events that trigger actions so that the users can quickly test and modify the sequences to improve the user experience. The systems and techniques also give users the ability to configure direct actions or triggers within a running sequence and independent of a running sequence for best user experience. The system enables users to configure and test the scenarios without being proficient (or even capable) of writing code for the sequences. Instead, the system provides a graphical user interface that enables the users to select devices for event triggers (e.g., particular sensors or other input modalities), configure each event trigger (e.g., specify threshold values or particular gestures), and determine an event, or a sequence of events that, when detected, causes one or more actions to be performed. In addition, each of these actions could be configured to be a trigger on its own for other actions. Absent these techniques, a user would not be able to configure and test the scenarios in real time, e.g., using a prototype of the system in which the scenarios will be used to initiate actions. Thus, the techniques described herein reduce development time, increase productivity, allow for new features to be scaled much faster, compare new hardware interaction with the scenario sequences, optimize or improve the best end user experience outcomes, reduce the feedback loop between testing and reconfiguration (if needed), improve user satisfaction, and result in better end user experiences.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

An event sequencing system enables users (e.g., user experience designers) to quickly and easily create, configure, modify, test, and use scenarios. Each scenario can include an event or a sequence of events that, when detected, triggers one or more actions. The event sequencing system can provide user interfaces (e.g., graphical user interfaces) that enable users to quickly configure and modify the scenarios so that the users can test the scenarios in real time, e.g., with a prototype or production unit with which the scenarios will be implemented. The event sequencing system can then monitor for various events and compare the events to the sequences of events specified by the scenarios. If the events match a scenario, the event sequencing system can initiate the action specified by the scenario. The actions can include actions performed by devices, such as computing devices or other physical devices, e.g., that are controlled by a computing device. The system can have multiple scenarios enabled and the operator can enable only one scenario at a time. The operator can also enable multiple scenarios at the same time and the system can be configured to recognize priorities across the scenarios for executions of the actions.

The events can originate from multiple different devices and different types of devices. For example, a device, e.g., a computing device, can detect an event and provide data specifying the event to the event sequencing system such that the events are occurrences of particular states or things that happen and that are detectable by computing devices. The devices can include voice recognition devices, gesture recognition devices, cameras, physical Internet of Things (IoT) sensors, e.g., temperature, pressure, humidity, motion, home appliances, home automation devices, manufacturing devices, etc., and/or other appropriate devices. A configured scenario can include a sequence of events detected by multiple different devices and different types of devices (e.g., different types of sensors or other devices). For example, a scenario for use in a car can include events detected by a temperature sensor and a gesture detection device. This example scenario can specify that, when the event sequencing system receives an event from the temperature sensor that indicates that the outside temperature is less than a threshold and an event from the gesture detection device that indicates that the user lifted their arm in a particular way, the event sequencing system executes an action which is to roll up the windows of the car.

In some implementations, an event of a scenario can be based on another scenario or the action of another scenario being initiated or completed. For example, a first scenario can specify that when the event sequencing system receives an event from a car indicating that the car is running and an event from a gesture detection device that indicates that the user lifted their arm in a particular way, the event sequencing system's action is to roll up the windows of the car. A second scenario can specify that, if the windows are rolled up in response to the events of the first scenario being detected and the outside temperature is greater than a threshold, the event sequencing system's action is to turn on the air conditioner of the car. Thus, multiple sequences can be active at the same time, use events from multiple different types of devices, and initiate actions by multiple different types of devices.

The systems and design optimization techniques described in this document can be applicable to many industries, such as vehicle controls, home automation, manufacturing, aircraft interior design, hospitals critical safety events, and oil and gas to name just a few examples. For example, an oil and gas designer may be planning new systems of experiences on a drilling platform where data collected from the drill and/or other new sensors will result in different types of actions and scenarios which will decide the best placement, experience, and performance of the system to address a specific event like drill failure. The event sequencing system enables the designer to experiment with different scenarios, sensors, triggers, actions, order of actions, type of actions, in real time and determine the best or optimal solution based on iterations of different behavior and experiences with which the end user will interact to address the problem being experienced.

In another example, the event sequencing system can be used to iterate and experiment with different designs, sensors, actuators, triggers, and actions to decide the best solution and end user experiences of interior designs of a car, train, truck, airplane, boat, or other type of vehicle in which users interact with their surroundings. The designer can experiment with different modes to determine the best combination of elements (e.g., sensors, actuators, triggers, and actions) that will result in the best end user experience.

The graphical user interfaces provided by the event sequencing system provide an easy, fast, and intuitive interface for restructuring the scenarios, sensors, actuators, events, and actions to create, test, and validate different experiences and compare performance of different sensors, actuators, events, and actions.

Figure 1:
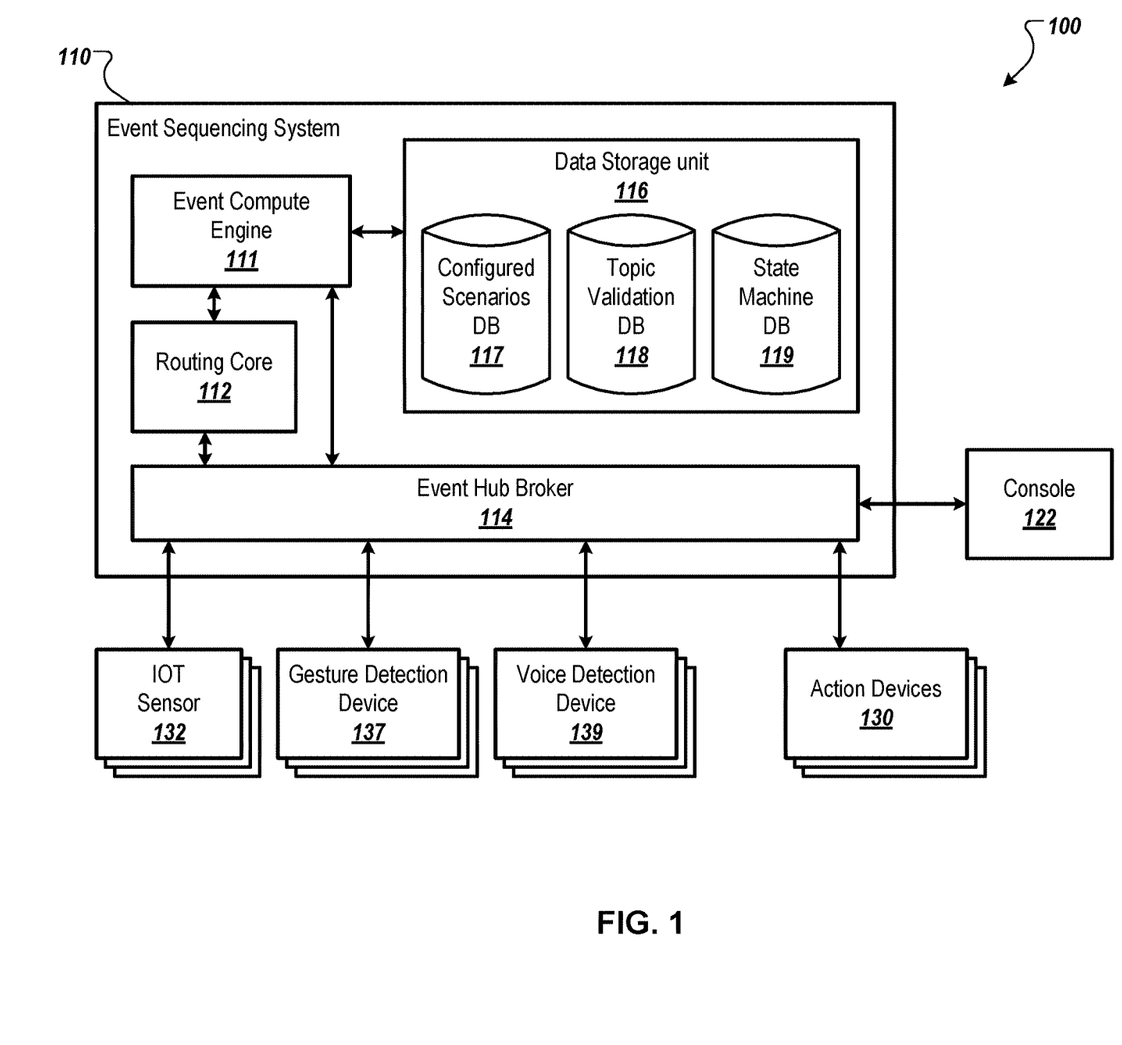
FIG. 1 is an example environment in which an event sequencing system enables users to configure scenarios that initiate actions based on sequences of events that can include triggers and actions.

FIG. 1 is an example environment 100 in which an event sequencing system 110 enables users to configure scenarios that initiate actions based on sequences of events. The event sequencing system 110 is connected to various devices, including Internet of Things (IoT) sensors 132, gesture detection devices 137, voice detection devices 139, and action devices 130. The event sequencing system 110 can also be connected to other types of devices, such as facial recognition devices, proximity sensors, virtual assistants, etc.

Some of the devices can detect events and/or measurements and provide, to the event sequencing system 110, data specifying the events and/or measurements. For example, some sensors, e.g., temperature sensors, humidity sensors, pressure sensors, etc., can periodically or continuously provide data specifying their measured parameters. In another example, the event sequencing system 110 can periodically request the data from the sensors. These measurements can then be used by the event sequencing system 110 to determine whether an event occurred, e.g., whether a temperature exceeds a threshold defined for an event.

Some smart devices, such as the gesture detection devices 137 and the voice recognition devices 139, can include hardware and/or software for detecting particular events. For example, a gesture detection device 137 can include a camera for capturing video of gestures and software for processing the video to detect the gestures. The smart devices may only provide data to the event sequencing system 110 in response to detecting particular events, e.g., particular gestures.

The action devices 130 can perform actions based on commands received from the event sequencing system 110, e.g., in response to each event of a scenario being detected. The action devices can include various devices depending on the implementation. For example, if the event sequencing system 110 is used to control components of a car, the action devices 130 can include a speed control system of the car, e.g., a cruise control system, electronic windows, entertainment systems, e.g., radio or video displays, climate control systems, sunroofs, etc. An action device 130 can include an actuator that controls the device based on commands received from the event sequencing system 110. For example, a radio that can be controlled by the event sequencing system 110 includes a volume control actuator that enables the event sequencing system 110 to adjust the radio's volume.

An action device 130 can also be a trigger to another action device 130. The action device 130 can provide information to the event sequencing system 110 that can be used in a scenario to trigger an action by another action device 130. For example, a climate control system can be turned on by the event sequencing system 110 and the status of the climate control system can be used to control the windows. In a particular example, the event sequencing system 110 can command electronic windows to roll up in response to the climate control system being turned on to cool a car.

The event sequencing system 110 can include or be connected to a console 122 that can be implemented as one or more computers. The console 122 can present graphical user interfaces that enable users, e.g., user experience designers or user environment designer, to quickly and easily create, configure, modify, test, and use scenarios that each include a sequence of events that trigger actions.

An interactive user interface can present configurable event elements and configurable action elements. A user can drag and drop each element onto a canvas of the user interface, configure the elements, and connect the elements to define the sequence of event elements that initiate an action for a scenario. Configuration of an event element can include specifying the trigger condition of an event that must be satisfied to initiate the action and the device that is to detect the event or data used to detect the event. For example, configuration of a gesture event element can include specifying the particular gesture detected by a particular gesture detection device. In another example, configuration of a temperature event element can include specifying a particular temperature sensor, a threshold temperature or temperature range, and whether the event should be triggered when a temperature measurement provided by the temperature sensor is above or below the threshold.

Figure 4:
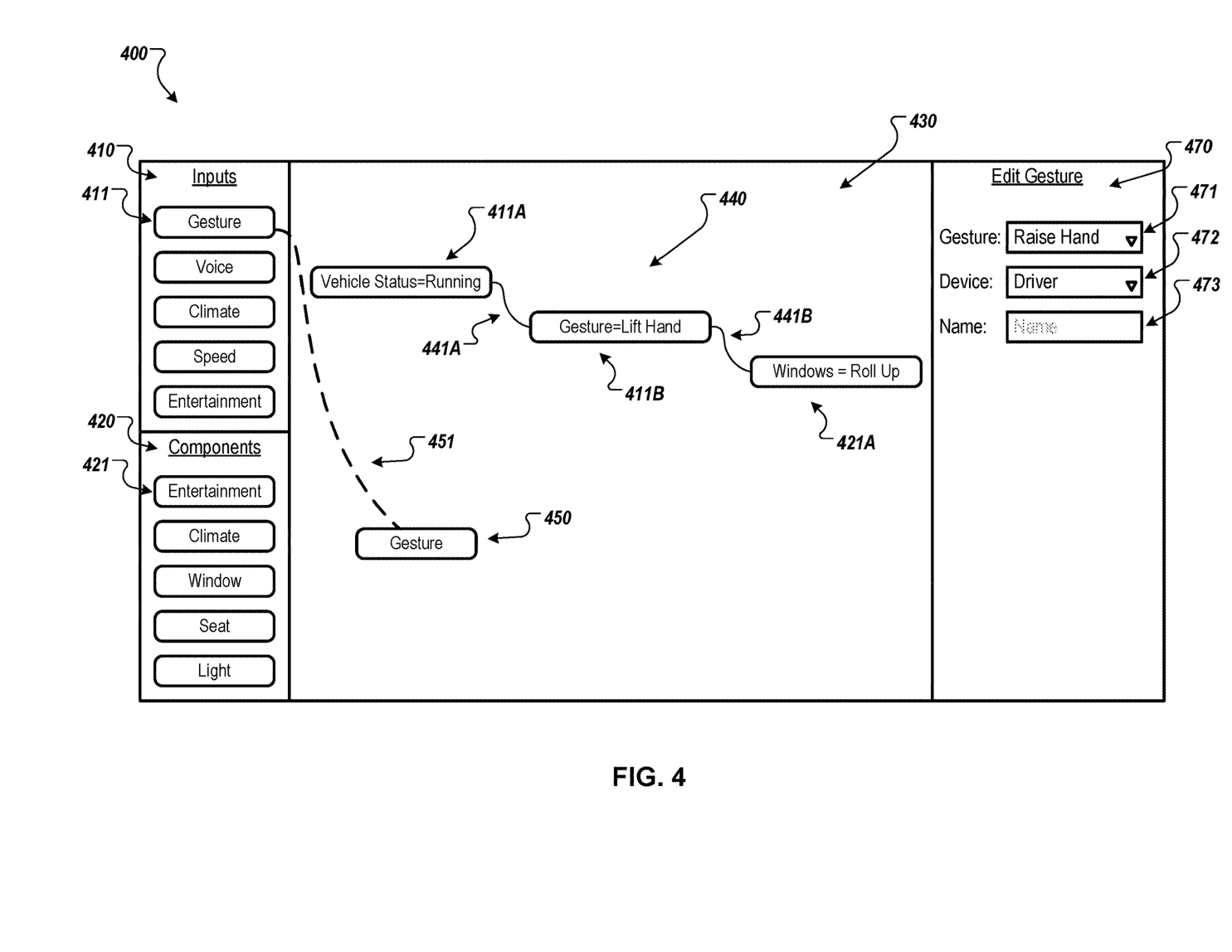
FIG. 4 is an illustration of an example user interface for configuring scenarios that initiate actions based on sequences of events.

Configuration of an action element can include selecting a component to perform the action and specifying the action to be performed by the component. For example, configuration of an action to turn on a light can include specifying the light and the action of the light, e.g., turn on, turn off, dim, brighten, etc. An example user interface for creating, configuring, and modifying scenarios is illustrated in FIG. 4 and described below.

The event sequencing system 110 stores the configured scenarios in a configured scenarios database 117 of a data storage unit 116, e.g., one or more hard drives, flash memory, cloud-based storage, etc. The users can use the console 122 to access configured scenarios that are stored in the configured scenarios database 117 and modify the scenarios. For example, a user can create, store, and test a scenario. The user can then experiment with the scenario, e.g., by changing the events, the sensors used to generate the events, the order of the events, and/or the action(s) initiated in response to each event in the scenario being detected. In this way, users can quickly and easily configure and test scenarios until the users determine an acceptable, improved, or best scenario for initiating an action.

The various devices 130, 132, 137, and 139 can communicate with the event sequencing system 110 using messages. For example, the devices can send and receive messages using the Message Queuing Telemetry Transport (MQTT) messaging protocol. In other examples, the devices and the event sequencing system 110 can use other message formats, such as Constrained Application Protocol (CoAP), Apache Kafka, RESTful HTTP, HTTP sockets, or another appropriate messaging protocol or technique.

The event hub broker 114 manages communication across the event sequencing system 110 and with the various devices, e.g., devices 130, 132, 137, and 139. In a publish/subscribe messaging system, such as MQTT, the event hub broker 114 ensures that all messages are received and delivered to/from subscribers and publishers. Generally, sensors are publishers (e.g., publishing a temperature measurement). Displays (e.g., the console 122) and actuators of action devices 130 are typically subscribers. In this system, any sensor or actuator can be both subscriber and/or publisher depending on what is required from each of those elements to send and receive data.

Each device can be configured to send and/or receive messages according to topics. The message topics can be related to the devices, inputs to the event sequencing system 110, and/or to outputs of the event sequencing system 110. Example topics for a vehicle implementation can include a windows topic for messages related to the vehicle's windows, an entertainment system topic for messages related to the vehicle's entertainment system, a climate system topic for messages related to the vehicle's climate control system, a temperature topic for messages related to temperature measurements, a light topic for messages related to the vehicle's lights, and a gesture topic for messages related to detected gestures. Of course, many other topics can also be used.

Each topic can have a defined format or payload structure. For example, the messages for the temperature topic can include a word that specifies the temperature scale, e.g., Fahrenheit or Celsius, and a numeric value that indicates the temperature expressed in terms of the specified temperature scale. The messages for the gesture topic can include the word "gesture" and a string of characters that indicates the detected gesture, e.g., "hand raised." The topics and their corresponding format or payload structures are stored in a topic validation database 118 and used to validate messages, as described below. When new devices are added to the environment 100 and connected to the event sequencing system 110, a topic can be defined for the device if there is not already a topic that corresponds to the device.

Each device that communicates with the event sequencing system 110 can include a messaging module, e.g., an MQTT agent or software wrapper interface, that sends to and receives messages from the event hub broker 114. The messaging module can be configured to send and receive messages according to a corresponding topic. For example, a messaging module can be added to a gesture detection device 137 to send and receive messages in the appropriate structure for the gesture topic.

The event sequencing system 110 also includes a routing core 112 that routes and filters some of the messages. For example, the routing core 112 can route and filter messages based on the payload of the messages. The routing core 112 can route and filter messages to prevent cyclic messaging within the event sequencing system 110. For example, the routing core 112 can identify the source of a message and ensure that the message is not transmitted back to the source.

The routing core 112 can ensure that the event compute engine 111 receives messages related to events. For example, the routing core 112 can invoke the event compute engine 111 when messages related to events are received. In some implementations, the messages that include data related to events can include a particular key that indicates that the message includes event data and should be processed by the event compute engine 111. If the routing core 112 receives a message that includes the particular key, the routing core 112 can forward the message to the event compute engine 111 for processing. Each device that publishes event data (e.g., each sensor, IoT device, etc.) can be configured to include the particular key in messages that include event data.

The event compute engine 111 can validate received messages. For example, the event compute engine 111 can evaluate a received message to ensure that the received message has an appropriate format or structure for the topic of the message. The event compute engine 111 can compare the format or structure of a received message to the topic definitions stored in the topic validation database 118. If the event compute engine 111 cannot validate a received message, e.g., the received message does not match a topic definition, the event compute engine 111 can discard or ignore the message. If the event compute engine 111 validates the received message, e.g., the received message does match a topic definition, the event compute engine 111 can evaluate the configured scenarios using the event of the received message.

The event compute engine 111 compares events in the form of triggers to the scenarios stored in the configure scenarios database 117. For example, the event compute engine 111 can compare each trigger event received (e.g., over a particular duration of time) to the trigger events of each scenario. If all of the trigger events of a scenario are satisfied, the event compute engine 111 can initiate the action specified by the matching scenario and trigger(s). That is, if the event compute engine 111 has received has received, from the devices 130, 132, 137, and/or 139 messages that specify each event of a scenario have occurred, the event compute engine 111 can initiate the action of that scenario.

The event compute engine 111 can maintain the status of the events for each scenario. The status can be satisfied or not satisfied. For example, when a message is received that indicates an event was detected, e.g., a gesture was detected, the event compute engine 111 can update the status of that event to satisfied in each scenario that includes the event as a trigger event. The event compute engine 111 can also determine whether all events of a scenario have been detected. If so, the event compute engine 111 can initiate the action of that scenario. If not, the event compute engine 111 can maintain the status of the events as having occurred or having not occurred while waiting for messages that specify events.

The event compute engine 111 can also update the status of an event from satisfied to not satisfied, e.g., before all of the trigger events of a scenario have been satisfied. For example, a scenario may include a trigger event that a vehicle is running and another event for a particular gesture. If the car is turned from running to off, the event compute engine 111 would receive a message indicating that the vehicle is no longer running and update the status of the event to not running. If the particular gesture is detected after the car is stopped, the action of the scenario would not be initiated as the status of the vehicle running event is no longer satisfied.

In some implementations, the events have to be satisfied in a particular order defined by a scenario. For example, a scenario can require that an IoT sensor report 132 a particular status prior to a particular spoken phrase is detected by a voice detection device 139.

To initiate an action of a scenario, the event compute engine 111 can publish a message to an action device 130 that is to perform the action. In some implementations, the event compute engine 111 publishes messages to topics based on the action device 130 that is to perform the action. Each action device 130 can subscribe to one or more topics related to the action device to receive messages published to the one or more topics. For example, a window control device for rolling up a window can be subscribed to a "window" topic. When the event compute engine 111 determines to initiate an action that controls the window, the event compute engine 111 can generate a message as an action with data specifying the control (e.g., roll up, roll down, or stop moving) and publish the message to the "window" topic. The window control device can receive the message, obtain the control data from the message, and perform the action specified by the data.

In some implementations, the event compute engine 111 checks the state of the action device 130 in a state machine database 119 that is to perform the action prior to initiating the action. For example, if the action device 130 is already in the state in which the action would put the action device 130, the event compute engine 111 does not have to initiate the action or send the message to initiate the action. In a particular example, if the action is to roll up a window and the window is already rolled up, the event compute engine 111 can determine the state and determine to not initiate the action to roll up the window.

When the event compute engine 111 determines that the received trigger events match a scenario, the event compute engine 111 can identify the action of the matching scenario, identify the device that is to perform the action, and obtain information specifying the state of the device from the state machine database 119. The event compute engine 111 can then determine whether the current state of the device matches the intended state that would be caused by the action. If the states do not match, the event compute engine 111 can initiate the action by sending a message specifying the action to the device that is to perform the action. If the states do match, the event compute engine 111 does not initiate the action. This can prevent or at least reduce redundant or conflicting messages from reaching edge devices.

The event compute engine 111 can also update the state of the devices in the state machine database 119. For example, after initiating an action to be performed by a particular device, the event compute engine 111 can update the state of the device to indicate the state that the device will be in after the action is performed. In a particular example, if the action is to stop a drill, the event compute engine 111 can update the state of the drill to be stopped in the state machine database 119. In some implementations, the device can provide confirmation of the action being performed and/or the device's state. In this example, the event compute engine 111 can update the state of the device in response to the data received from the device.

The event sequencing system 110 can include additional databases (not shown) that store information about the action devices 130 and attributes (e.g., face recognition, face position, etc.) of functionality for each action device 130, device identifiers, in addition to what topics it listens to and more. Similarly, the event sequencing system 110 can include a database with attributes representing all sensors and devices from which event information is received.

The event sequencing system 110 is modular and flexible. For example, a user can add new sensor, actuators, or other intelligent devices that can be included in scenarios. To add a new device, the device can be configured to include a messaging interface (e.g., a MQTT software wrapper interface) that enables the device to communicate with the event sequencing system 110 with the compatible messaging. The user can add to the topic validation database 118 a new definition for a new topic for the device and add the device to a hardware database list that specifies the devices connected to the event sequencing system 110. The new device would then be presented in the list of devices in the console's interfaces, e.g., the user interface illustrated in FIG. 4, such that the user can add the device to scenarios, e.g., as a sensor and/or action device 130.

In addition to the scenario-based triggers and actions, the event sequencing system 110 is capable of accepting direct messages, e.g., from a dashboard display of an end user dashboard or the console 122, to specifically control a particular action device 130, e.g., audio on/off, volume, etc., independent from events matching a scenario. This provides the user, e.g., user experience designer, the ability to try quick experiments with changing the behavior of various devices to decide later to include or exclude from scenario experimentation.

The event sequencing system 110 is also capable of simulating sensors and action devices 130 before they are physically available. This can be done by hosting software on a computer which will produce topic messages as triggers or received messages as actuators or both. The software can interact with the event sequencing system 110 as if the real element (e.g., sensors or actuators) exists and is in data communication with the event sequencing system 110. This can be very helpful to test all the system elements, topics, scenarios, sequences, and other areas to make sure everything is running before the availability of the physical element.

In addition to scenario/sequence-based invocation the event sequencing system 110 is capable of accepting "direct messages" sent by any device to activate any of the action devices 130. This gives flexibility to the user to invoke any triggering event or actuator components at any time independently and/or during a scenario to collect specific experiences, outputs, results or analysis. There are challenges of potential interference and conflicts from "direct messages" specifically when a scenario sequence is running. To resolve such conflicts, the design of the event compute engine 111 can be implemented in a way such that the event compute engine 111 does not always communicate directly with the action devices 130. This may be done because the triggering event does not have control of the actuator state, e.g., if the windows are already down, the event compute system 111 should avoid instructing the windows to roll down again.

The event compute system 111 could provide access to the state machine database 119 to every component in the system. However, the event compute system 111 may need to provide authentication to each of these components. The event compute system 111 could also encounter difficulty when many items are trying to update the same state. In some implementations, only one entity, which is the event compute engine 111 in this example, is allowed to update any actuator state.

It is very cumbersome and complicates the system to try to inform the sender of the status, especially when their message is overwritten by another action in the system. (e.g., a gesture tells the windows to roll down and then the dashboard tells the windows to roll up). Using an intelligent scalable centralized event compute system 111 gives the system a chance to reduce the number of topics/subscriptions which reduces cost and network traffic congestion at scale. For example, the event compute system 111 does not need a trigger like voice virtual agent to subscribe to the windows topic plus every new actuator that is added. Each device can only receive messages related to its topic.

Some aspects of this "direct messages" design is the ability to route messages to specific components and also ability to have specific components (rather than all components) process the requests. These "direct messages" should not trigger sequences in scenarios. Instead, these messages should trigger only the event compute engine 111 (so it can also update the state of the device), but the event compute engine 111 should not check if the message should start a scenario. In this way, the compute processing of the event compute engine 111 is focused. In some implementations, each message includes a field in the payload, e.g., called "shouldTriggerSeq," that, if true causes the event compute engine 111 to compare the event of the message to the scenarios. These "direct messages" can always have "shouldTriggerSeq"=false.

In some implementations, the state machine database 119 can accommodate multiple trigger events that start a scenario and able to respond to the sender of direct messages. The event compute system 111 can store an identifier for the device that sent the message in order to respond to the device (e.g., for direct messages). The event compute system 111 can also store the topic of the message. This could be helpful if there are two instances of the same triggering event (e.g., two voice triggers systems hardware), but only one sent a "window down" message. This allows the event compute system 111 to notify only the instance that sent the "window down" message.

The event compute system 111 can also store context data that specifies the last time a particular message was received. This allows users to create scenarios that require events to happen within a particular time duration of each other or that require that at least a particular time duration lapses between an event and another event. For example, a scenario can require that gesture A and gesture B occur within 10 seconds of each other. In this example, the event compute system 110 can trigger a specific scenario if it receives gesture A and gesture B within 10 seconds of each other.

In some implementations, the event sequencing system 110 performs intelligent data analytics (e.g., artificial intelligence analytics) to help the users (e.g., administrators and user experience designers) to make decisions on best outcome of experiences and scenarios. As the event sequencing system 110 (or another system) can collect many runtime data points across from many sensors, actuators, experiences and from multiple event sequence systems, there is an ability to do analytics within a system and across different event sequencing systems. For example, an individual event sequencing system can be installed for each instance of a system that the event sequencing system controls. In a particular example, an event sequencing system that controls components of a car can be installed in each car.

The analytics can include determining how often a sensor is used with what action device 130. This helps in understanding common usage patterns of a specific region where the system resides and what similar new future sensors or action devices 130 to consider for this region or user.

The analytics can include the types of the most trigger events used across all event sequencing systems, for which region and for which users. This helps users explore other triggering events or understand why these triggering events are used the most and share the results with other event sequencing system owners.

The analytics can include the types of the most action devices used across all event sequencing systems, for which region and for which users. This helps users explore other action devices 130 or understand why these triggers are used the most and share results with other event sequencing system owners.

The analytics can include an analysis on how many scenarios use similar sequences of events which helps identify trends of usage/experiences in the industry and ecosystem to enable better future business decisions. The analytics can include an analysis on how many times a specific scenario ran in an event sequencing system and for how long.

The analytics can include the ability to recommend a specific trigger/actions/action device for a specific sequence based on analysis of what the user/admin has chosen to use in the past. The analytics can include analyzing specific usage patterns and trends of a specific user/admin/designers related to triggers, actuators, scenarios, habits, order within sequences, actions turning to triggers, in the form of how often used, when used across timelines/dates, and more.

Figure 2:
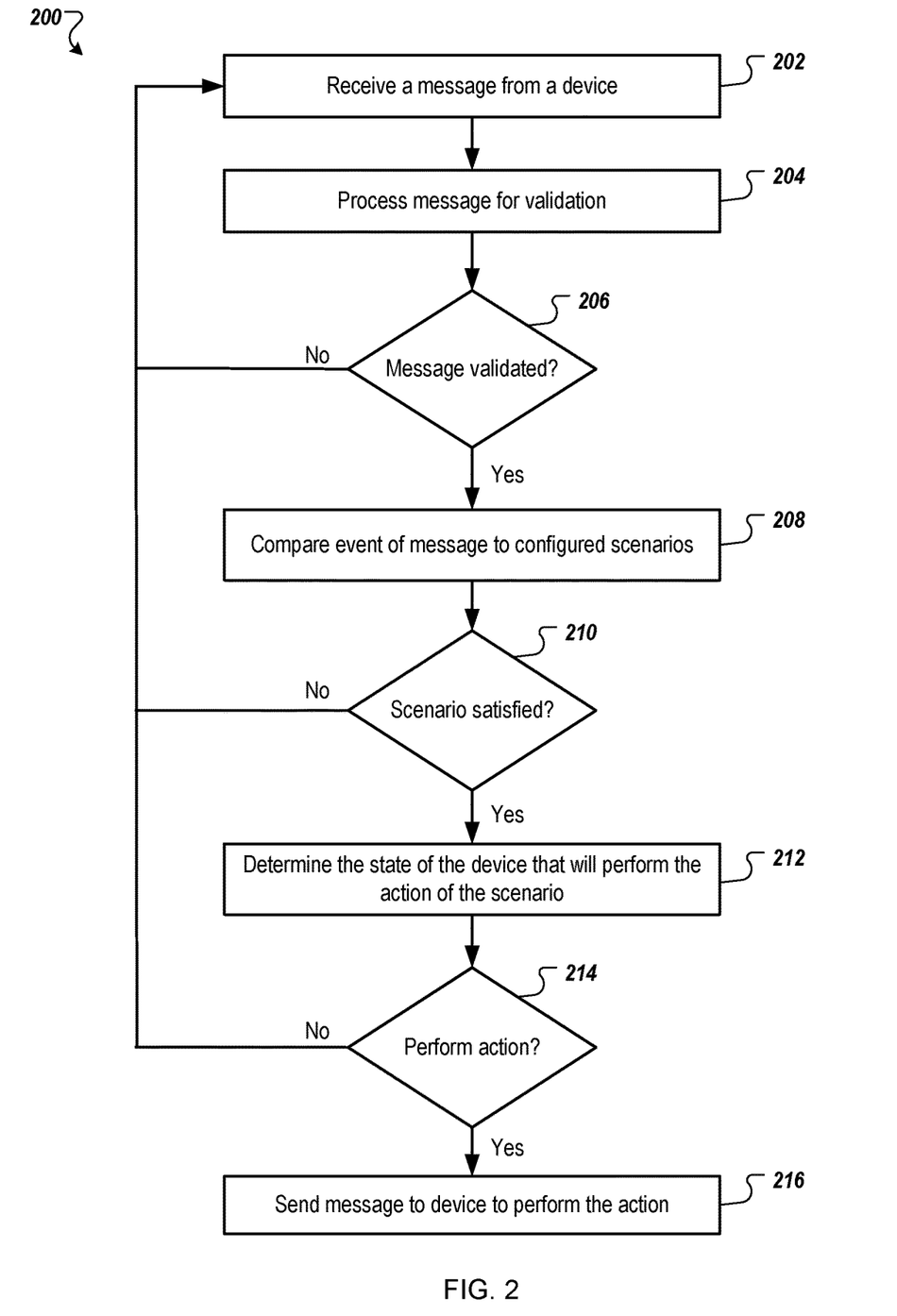
FIG. 2 is a flow diagram of an example process for initiating an action based on a detected sequence of events.

FIG. 2 is a flow diagram of an example process 200 for initiating an action based on a detected sequence of events. Operations of the process 200 can be performed, for example, by one or more data processing apparatus, such as the event sequencing system 110 of FIG. 1. Operations of the process 200 can also be implemented as instructions stored on a non-transitory computer readable medium. Execution of the instructions cause one or more data processing apparatus to perform operations of the process 200.

A message is received from a device (202). The message can include a payload with data specifying a measurement by a sensor, e.g., an IoT sensor or data specifying an event, e.g., a gesture. For example, the message can be received from an IoT sensor or a device that detects events, such as a gesture detection device or a voice detection device.

The message can be structured based on the structure for a particular topic. As described above each topic can have a corresponding format or structure for messages of that topic. For example each device can be configured to listen for and send messages having one or more topics that are relevant to the device. In some particular examples, a temperature sensor can send messages with a temperature topic and a voice detection device can send messages with a voice topic.

The message is processed for validation (204). For example, the structure of the message can be compared to the defined structure for the topic of the message. The topic of the message can be identified and a defined structure for the identified topic can be obtained from a topic validation database. The structure of the message can then be compared to the structure defined for the topic. For example, the structure can specify an alphanumeric format of the payload, one or more keywords of the payload, e.g., Celsius or Fahrenheit for a temperature sensor, and/or other structural aspects of the message.

A determination is made whether to validate the message (206). If the structures do not match, the message is not validated and the message can be ignored or discarded. The process 200 can return to operation 202 to wait for additional messages. If the structures do match, the message is validated.

If the message is validated, the event of the message is compared to configured scenarios (208). For some devices, the message specifies the event. For example, a gesture detection device can send messages specifying particular gestures detected by the gesture detection device. For some devices, the message specifies a measurement or other collected data without specifying an event. In this example, the system, e.g., the event sequencing system 110 can compare the measurement of data to a threshold for an event to determine whether an event occurred.

A determination is made whether a scenario is satisfied (210). This determination can include determining whether each trigger event of the scenario has been satisfied. For example, the status of each trigger event in a scenario can be evaluated. If all trigger events of a scenario are satisfied, then the scenario may be satisfied. As described above, a scenario can require the events to be satisfied in a particular order or within a particular duration of time. In some implementations, only the scenarios that include, as a trigger event, the event specified by the most recently received event are evaluated.

If no scenarios are satisfied, the process 200 returns to operation 202 to wait for additional message. If a scenario is satisfied, the state of the device that will perform the action of the scenario is determined (212). For example, as described above, a state machine database can maintain the state of devices that perform actions based on satisfied scenarios.

A determination is made whether to perform the action of the scenario (214). This determination can be based on the state of the device that will perform the action of the scenario. For example, if the device that will perform the action is already in the state that the action would place the device, then the action will not be performed. That is, if the post-action state that the device would be in matches the current state of the device, then the action will not be performed. Thus, the system would not send a message to the device to perform the action. The process 200 can then return to operation 210.

If the post-action state does not match the current state, a message is sent to the device to instruct the device to perform the action (216). For example, the system can publish a message with the topic for which the device listens. In a particular example, if the action is to stop a drill, the system can publish a message with a drill topic and publish the message. The drill can listen for, e.g., be subscribed to, messages having the drill topic, receive the message, and stop drilling in response to receiving the message.

Figure 3:
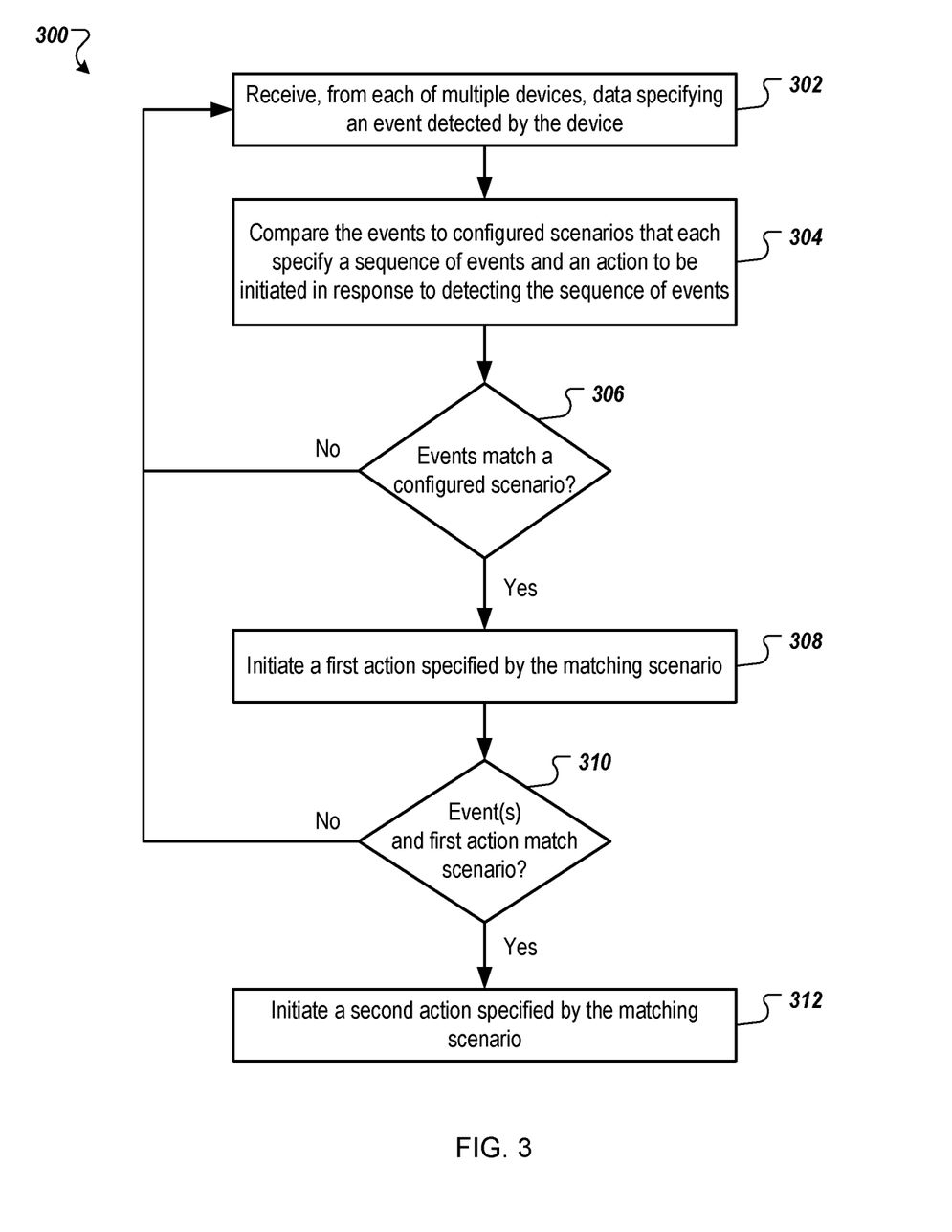
FIG. 3 is a flow diagram of another example process for initiating an action based on a detected sequence of events.

FIG. 3 is a flow diagram of an example process 300 for initiating an action based on a detected sequence of events. Operations of the process 300 can be performed, for example, by one or more data processing apparatus, such as the event sequencing system 110 of FIG. 1. Operations of the process 300 can also be implemented as instructions stored on a non-transitory computer readable medium. Execution of the instructions cause one or more data processing apparatus to perform operations of the process 300.

Data specifying an event detected by a device is received (302). As described above, the devices can include physical sensors (e.g., temperature, pressure, humidity, motion, etc.), IoT devices (home appliances, home automation devices, manufacturing devices, etc.), voice recognition devices, and/or other appropriate devices. Each device can send data specifying events detected by the device. The data can specify particular events (e.g., a particular gesture) or data that can be used to determine that an event occurred (e.g., temperature measurement, description of the motion of the gesture, etc.).

The event is compared to configured scenarios (304). Each scenario can include multiple events and one or more actions that are performed in response to the events being detected. If data for other events has been received, the combination of events (and optionally their order) can be compared to the scenarios.

A determination is made whether the events match a scenario based on the comparison (306). If not, the process 300 returns to operation 302 to monitor for data related to other events. If so, a first action specified by the matching scenario is initiated (308). For example, initiating the action can include sending a message that specifies the action can be sent to a device that is to perform the action.

A determination is made whether one or more received events and the first action matches another scenario (310). For example, the first scenario can specify that a car window is to be rolled up in response to events specifying that the car is running and a particular hand gesture has been detected. A second scenario can specify that the car's air conditioner is to be turned on in response to events specifying that the windows are being rolled up in response to the first scenario and the outside temperature is greater than a threshold.

If the one or more received events and the first action do not match another scenario, the process 300 returns to operation 302 to monitor for data related to other events. If the one or more received events and the first action do not match a second scenario, a second action specified by the second scenario is initiated (312). For example, initiating the action can include sending a message that specifies the action can be sent to a device that is to perform the action.

FIG. 4 is an illustration of an example user interface 400 for configuring scenarios that initiate actions based on sequences of events. The user interface 400 includes an input menu 410 that includes configurable event elements 411 and a component menu 420 that includes action elements 421. A user can place the elements 411 and 421 on a canvas 430 and configure scenarios using the elements 411 and 421. For example, a user can click and drag onto the canvas 430 each element 411 and 421 that the user wants to include in the scenarios. The dashed line 451 shows a gesture event element 450 being dragged and dropped onto the canvas 430.

The user interface 400 also enables the user to connect elements 411 and 421 with connectors, e.g., connectors 441A and 441B. The connectors define the sequence between the elements. For example, the connector 441A connects the output of a vehicle event element 411A to the input of a gesture event element 411B. In addition, the connector 441B connects the output of the gesture event element 411B to an input of a window action element 421A. In this example scenario 440, the window action element 421A is activated when the gesture event element 411B is satisfied after the vehicle event element 411A is satisfied. That is, the event sequencing system 110 will initiate the action to roll up the vehicle's windows, e.g., by sending a message with such instructions to the vehicle's window actuator(s), in response to a gesture detection device detecting a person raising an arm while the vehicle is running.

The user interface 400 includes an element editing interface 470 that enables a user to configure each element that is placed on the canvas 430. Each element can include properties that define their respective device and event or action. Each event element 411 can have a corresponding event and a corresponding device from which the event is detected. Each action element can have a corresponding action and a corresponding device that performs the action.

The element editing interface 470 can present controls that enables a user to view and configure the properties of an element in response to the element being placed on the canvas 430 or being selected by a user after being placed on the canvas 430. In this example, the element editing interface 470 enables the user to view and configure the properties of the gesture event element 450 in response to the user placing the gesture event element 450 on the canvas 430. In particular, the element editing interface 450 includes an action drop down menu 471 that enables the user to select a gesture, a device drop down menu 472 that enables the user to select the gesture detection device that will detect the gesture selected from the action drop down menu 471, and a name element 473 that enables the user to enter a name for the gesture event element 450 that will appear on the gesture event element 450 when presented on the canvas 430.

The element editing interface 470 can present different types of controls for the different types of elements. Some types of event elements 411 can have a corresponding set of events that are included in a drop down menu for configuring the event of the event element 411. For example, a temperature event element can include a set of events that includes greater than, equal to, less than, within a range, outside of a range, etc. For this element, the user can select one of the events and select or enter a temperature threshold or range that corresponds to the event. A gesture event element can include a set of gestures that gesture detection devices connected to the event sequencing system 110 are configured to detect. The element editing interface 470 presented for a voice event element can include a text entry box for the user to enter a phrase that has to be spoken by a user to satisfy the voice event.

The element editing interface 470 can present similar controls for action events. For example, each action element can have a corresponding set of actions that a component is capable of performing. In this example, the element editing interface 470 can present a drop down menu that enables a user to select from the capable actions. Some actions can be customized. For example, a climate action can have a custom temperature, e.g., set the thermostat to a particular temperature. In this example, the element editing interface 470 can present a text entry box for a user to enter the temperature for the climate control system when the action is initiated.

Each type of element 411 and 421 can correspond to a set of one or more devices. For example, a temperature event element can correspond to one or more temperature sensors. In this example, the element editing interface 470 can present a drop down menu for the user to select a temperature sensor for a temperature event element. In another example, some gesture detection devices can detect different gestures than other gesture detection devices. In this example, the drop down menu to select a gesture can include an aggregate list of the gestures that can be detected by all of the gesture detection devices. When the user selects a particular gesture, the drop down menu for selecting the gesture detection device can be limited to the gesture detection device(s) that can detect the selected gesture.

A user can use the user interface 400 to generate multiple scenarios that are then used to initiate actions. The user interface 400 enables a user to quickly select events and actions, change their properties and sequences, and test the various scenarios in the fly and without writing any code. This can increase the speed and efficiency in generating and testing scenarios. The event sequencing system 110 can store the scenarios created and modified using the user interface 400 in the configured scenarios database 117 and use the scenarios to initiate actions, as described above.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 5:
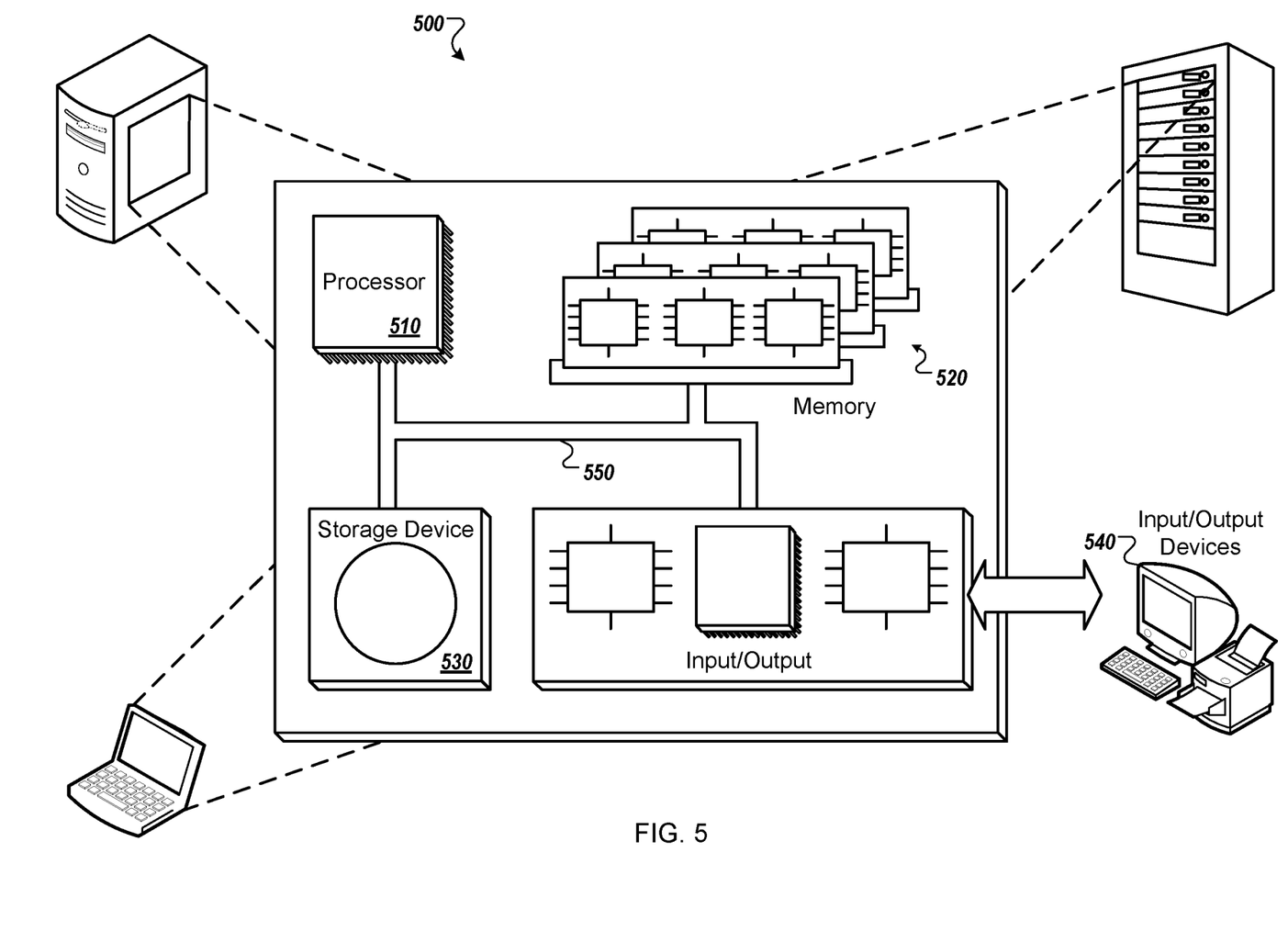
FIG. 5 is a block diagram of a computing system that can be used in connection with computer-implemented methods described in this document.

An example of one such type of computer is shown in FIG. 5, which shows a schematic diagram of a generic computer system 500. The system 500 can be used for the operations described in association with any of the computer-implemented methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 400. In one implementation, the input/output device 540 includes a keyboard and/or pointing device. In another implementation, the input/output device 540 includes a display unit for displaying graphical user interfaces.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
    receiving, from multiple devices having different input modalities, data specifying events detected by the devices;
    comparing the events to a plurality of configured scenarios that each include a sequence of trigger events and an action to be initiated in response to detecting the sequence of trigger events;
    determining, based on the comparing, that a first scenario of the plurality of scenarios has a satisfied status based on the events detected by the multiple devices matching all of the trigger events of the first scenario;

in response to determining that the first scenario has a satisfied status, initiating a first action of the first scenario;

determining that the first action has been performed;

determining that a combination of (i) the first scenario having a satisfied status and (ii) the first action being performed matches a second scenario of the plurality of scenarios; and in response to determining that the combination of (i) the first scenario having a satisfied status and (ii) the first action being performed matches the second scenario, initiating a second action of the second scenario.

2. The method of claim 1, wherein the multiple devices include at least one sensor that detects, as an event, a measurement of a particular property and at least one user interaction detection device that detects a human performed action.

3. The method of claim 2, wherein the user interaction detection device comprises one of (i) a gesture detection device that detects human gestures or (ii) a voice detection device that detects voice input.

4. The method of claim 1, further comprising providing a dashboard user interface that enables a user to configure and modify scenarios by selecting sequences of events and one or more actions for the scenarios.

5. The method of claim 1, wherein initiating the first action comprises determining, based on a state of a device that performs the first action specified by the first scenario, that a device that performs the first action is in a state in which the first action is capable of being performed and, in response, initiating the first action.

6. The method of claim 1, wherein receiving, from the multiple devices, data specifying the events detected by the devices comprises receiving, for each device, data specifying whether the event invokes a scenario comparison process in which the events are compared to the scenarios, wherein the events are compared to the plurality of configured scenarios in response to the data for at least one of the events specifying that the at least one event invokes the scenario comparison process.

7. The method of claim 1, wherein initiating the first action comprises:

generating a message with a topic for the first action and data specifying the first action; and transmitting the message to each device that is subscribed to the topic for the first action.

8. A system, comprising:

a data processing apparatus; and a memory storage apparatus in data communication with the data processing apparatus, the memory storage apparatus storing instructions executable by the data processing apparatus and that upon such execution cause the data processing apparatus to perform operations comprising:

receiving, from multiple devices having different input modalities, data specifying events detected by the devices;

comparing the events to a plurality of configured scenarios that each include a sequence of trigger events and an action to be initiated in response to detecting the sequence of trigger events;

determining, based on the comparing, that a first scenario of the plurality of scenarios has a satisfied status based on the events detected by the multiple devices matching all of the trigger events of the first scenario;

in response to determining that the first scenario has a satisfied status, initiating a first action of the first scenario;

determining that the first action has been performed;

determining that a combination of (i) the first scenario having a satisfied status and (ii) the first action being performed matches a second scenario of the plurality of scenarios; and in response to determining that the combination of (i) the first scenario having a satisfied status and (ii) the first action being performed matches the second scenario, initiating a second action of the second scenario.

9. The system of claim 8, wherein the multiple devices include at least one sensor that detects, as an event, a measurement of a particular property and at least one user interaction detection device that detects a human performed action.

10. The system of claim 9, wherein the user interaction detection device comprises one of (i) a gesture detection device that detects human gestures or (ii) a voice detection device that detects voice input.

11. The system of claim 8, wherein the operations comprise providing a dashboard user interface that enables a user to configure and modify scenarios by selecting sequences of events and one or more actions for the scenarios.

12. The system of claim 8, wherein initiating the first action comprises determining, based on a state of a device that performs the first action specified by the first scenario, that a device that performs the first action is in a state in which the first action is capable of being performed and, in response, initiating the first action.

13. The system of claim 8, wherein receiving, from the multiple devices, data specifying the events detected by the devices comprises receiving, for each device, data specifying whether the event invokes a scenario comparison process in which the events are compared to the scenarios, wherein the events are compared to the plurality of configured scenarios in response to the data for at least one of the events specifying that the at least one event invokes the scenario comparison process.

14. The system of claim 8, wherein initiating the first comprises:

generating a message with a topic for the first action and data specifying the first action; and transmitting the message to each device that is subscribed to the topic for the first action.

15. A computer program product, encoded on one or more non-transitory computer storage media, comprising instructions that when executed by one or more computers cause the one or more computers to perform operations comprising:

receiving, from multiple devices having different input modalities, data specifying events detected by the devices;

comparing the events to a plurality of configured scenarios that each include a sequence of trigger events and an action to be initiated in response to detecting the sequence of trigger events;

determining, based on the comparing, that a first scenario of the plurality of scenarios has a satisfied status based on the events detected by the multiple devices matching all of the trigger events of the first scenario;

in response to determining that the first scenario has a satisfied status, initiating a first action of the first scenario;

determining that the first action has been performed;

determining that a combination of (i) the first scenario having a satisfied status and (ii) the first action being performed matches a second scenario of the plurality of scenarios; and in response to determining that the combination of (i) the first scenario having a satisfied status and iii) the first action being performed matches the second scenario, initiating a second action of the second scenario.

16. The computer program product of claim 15, wherein the multiple devices include at least one sensor that detects, as an event, a measurement of a particular property and at least one user interaction detection device that detects a human performed action.

17. The computer program product of claim 16, wherein the user interaction detection device comprises one of (i) a gesture detection device that detects human gestures or (ii) a voice detection device that detects voice input.

18. The computer program product of claim 15, wherein the operations comprise providing a dashboard user interface that enables a user to configure and modify scenarios by selecting sequences of events and one or more actions for the scenarios.

19. The computer program product of claim 15, wherein initiating the first action comprises determining, based on a state of a device that performs the first action specified by the first scenario, that a device that performs the first action is in a state in which the first action is capable of being performed and, in response, initiating the first action.

20. A computer-implemented method comprising:

receiving, from a first device, a message having a topic and a payload that includes data related to a first event;

determining whether a structure of the message matches a predefined structure for messages having the topic;

in response to determining that the structure of the message matches the predefined structure for messages having the topic, validating the message;

in response to validating the message, comparing the first event to a plurality of configured scenarios that each specify a sequence of trigger events and an action to be initiated in response to detecting the sequence of trigger events;

determining, based on the comparing, that the first event and one or more second events detected by the one or more second devices match a first scenario of the plurality of scenarios;

in response to determining that the first event and the one or second events match the first scenario, determining whether a current state of a third device that performs the action of the first scenario matches a post-action state that the third device would be in after the action is performed;

whenever the current state matches the post-action state, determining to not send a message to the third device to perform the action; and whenever the current state does not match the post-action state, sending a message to the third device to perform the action.

* * * * *

UNITED STATES PATENT AND TRADEMARK OFFICE
CERTIFICATE OF CORRECTION

| | |
|---|---|
| PATENT NO. | : 11,467,553 B2 |
| APPLICATION NO. | : 16/658757 |
| DATED | : October 11, 2022 |
| INVENTOR(S) | : Matthew Thomas Short et al. |

It is certified that error appears in the above-identified patent and that said Letters Patent is hereby corrected as shown below:

In the Claims

In Claim 15, Column 21, Line 7, delete "iii)" and insert -- (ii) --.

Signed and Sealed this
Twenty-second Day of November, 2022

*Katherine Kelly Vidal*

Katherine Kelly Vidal
*Director of the United States Patent and Trademark Office*